United States Patent
Kwon et al.

(10) Patent No.: US 8,548,378 B2
(45) Date of Patent: Oct. 1, 2013

(54) COMMUNICATION SYSTEM FOR TRANSMITTING DATA USING COOPERATIVE COMMUNICATION RELAY

(75) Inventors: Tae Soo Kwon, Hwaseong-si (KR); Chang Yong Shin, Seoul (KR); Young-Doo Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 12/099,743

(22) Filed: Apr. 8, 2008

(65) Prior Publication Data

US 2009/0176492 A1 Jul. 9, 2009

(30) Foreign Application Priority Data

Jan. 3, 2008 (KR) .................. 10-2008-0000873

(51) Int. Cl.
*H04B 7/185* (2006.01)
(52) U.S. Cl.
USPC .............................. 455/13.1; 455/7
(58) Field of Classification Search
USPC ............ 455/7, 13.1, 16, 492, 11, 517, 311, 455/15, 524, 574, 405; 370/226, 311, 332, 370/315, 342, 244
See application file for complete search history.

(56) References Cited

U.S. PATENT DOCUMENTS

| | | | |
|---|---|---|---|
| 6,785,513 B1 | 8/2004 | Sivaprakasam | |
| 6,823,180 B2 | 11/2004 | Reed et al. | |
| 2004/0225740 A1 | 11/2004 | Klemba et al. | |
| 2004/0242154 A1 * | 12/2004 | Takeda et al. | 455/16 |
| 2007/0160014 A1 * | 7/2007 | Larsson | 370/338 |
| 2008/0085677 A1 * | 4/2008 | Sheen et al. | 455/7 |
| 2008/0186949 A1 * | 8/2008 | Hafeez et al. | 370/350 |

FOREIGN PATENT DOCUMENTS

| | | |
|---|---|---|
| KR | 20-0396962 | 9/2005 |
| WO | WO 2005062728 A2 * | 7/2005 |

* cited by examiner

*Primary Examiner* — Edward Urban
*Assistant Examiner* — Golam Sorowar
(74) *Attorney, Agent, or Firm* — NSIP Law

(57) ABSTRACT

A mobile station which connects to a base station having a plurality of relays belonging thereto is provided. The mobile station includes a receiving unit which receives a first preamble signal from a first relay and receives a second preamble signal from a second relay, the first relay belonging to a first cluster including an N1 number of relays and the second relay belonging to a second cluster including an N2 number of relays, a control unit which selects the first cluster as an access cluster to connect to the base station, based on the first preamble signal and the second preamble signal, and a transmission unit which transmits an access request message to the first relay, wherein the access request message is transmitted to the base station via the first relay.

17 Claims, 9 Drawing Sheets

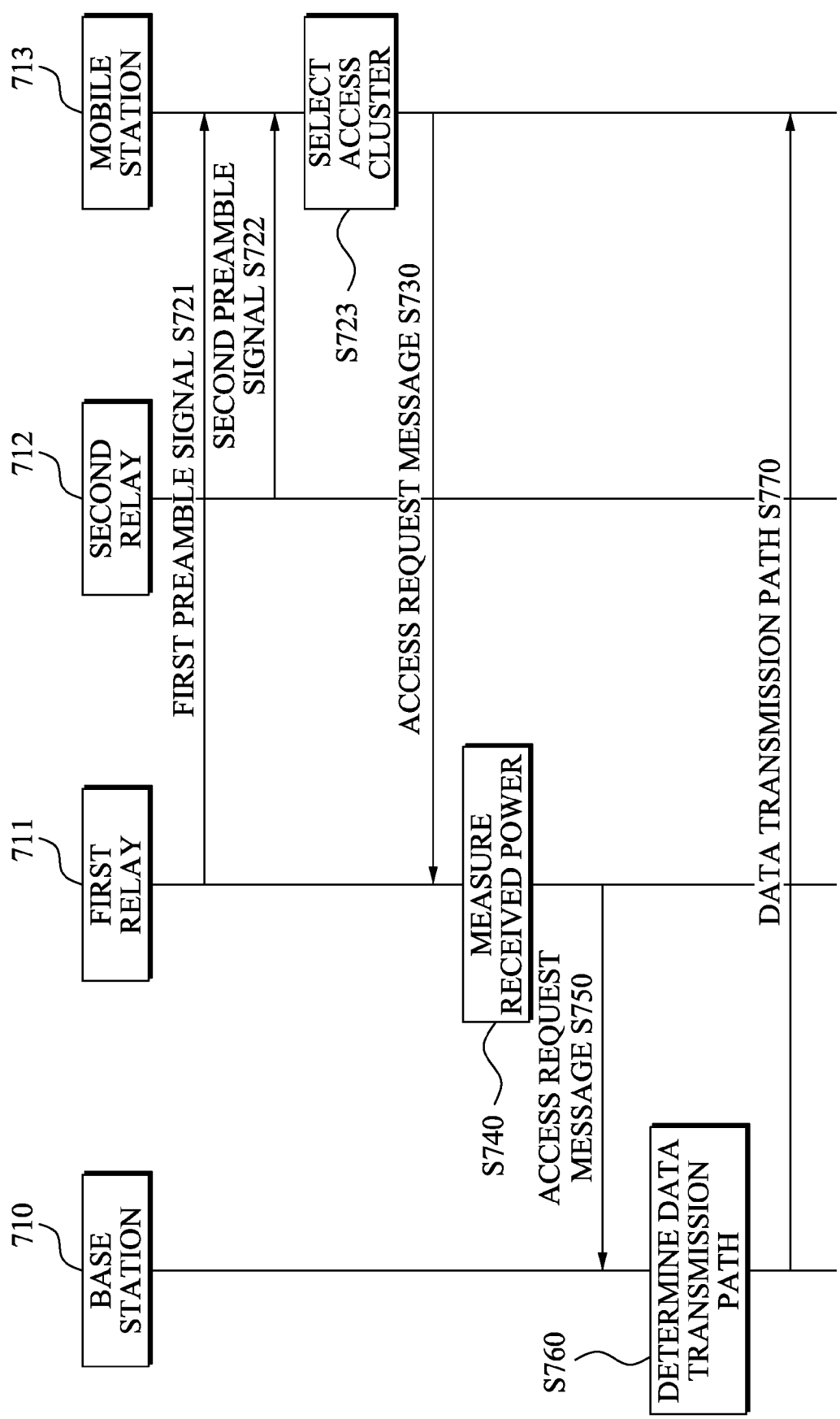

COMMUNICATION SYSTEM FOR TRANSMITTING DATA USING COOPERATIVE COMMUNICATION RELAY

CROSS-REFERENCE TO RELATED APPLICATION

This application claims the benefit under 35 U.S.C. §119(a) of a Korean Patent Application No. 10-2008-0000873, filed on Jan. 3, 2008, in the Korean Intellectual Property Office, the entire disclosure of which is incorporated herein by reference.

TECHNICAL FIELD

Methods and apparatus consistent with the following description relate to a wireless data transmission system using a relay, and more particularly, to a cooperative communication relay belonging to a base station, a mobile station connecting to the base station using the cooperative communication relay, and the base station.

BACKGROUND

A mobile communication system assigns wireless resources allocated to the mobile communication system to a plurality of base stations. Each mobile station connected to a base station communicates with the base station using the assigned wireless resources.

Since the number of users using a mobile communication service increases and a bandwidth of services used by each user increases, assigned wireless resources are used by a plurality of mobile stations. As the number of mobile station connected to a base station increases, a bandwidth of wireless resources which may be used by each mobile station is limited. Since a bandwidth of services used by a mobile station gradually increases, the number of mobile station which may be connected to a single base station is limited.

A scheme of installing a plurality of relays to increase coverage of a base station is provided to overcome the above-described disadvantage. A base station transmits data to each relay and a mobile station receives the data from each of the relays. Since a base station is required to transmit a signal to all mobile stations located within the coverage of the base station, the base station is required to transmit a strong signal with much power. However, a relay may transmit data with relatively little power. Since each relay transmits data to a mobile station with little power, wireless resources used by each relay may be reused by another relay which is physically separated from each of the relays.

SUMMARY

According to an aspect, there is provided a mobile station which connects to a base station, the base station having a plurality of relays belonging thereto, and the mobile station including a receiving unit which receives a first preamble signal from a first relay and receives a second preamble signal from a second relay, the first relay belonging to a first cluster including an N1 number of relays and the second relay belonging to a second cluster including an N2 number of relays, a control unit which selects the first cluster as an access cluster to connect to the base station, based on the first preamble signal and the second preamble signal, and a transmission unit which transmits an access request message to the first relay, wherein the access request message is transmitted to the base station via the first relay.

According to another aspect, there is provided a relay which belongs to a cluster including a plurality of relays, the relay including a transmission unit which transmits a preamble signal to a mobile station located in a service area of the cluster, and a receiving unit which receives an access request message generated based on the transmitted preamble signal from the mobile station, wherein the transmission unit transmits the received access request message to a base station where the relay belongs.

According to still another aspect, there is provided a base station apparatus, including a cluster assignment unit which divides a coverage of a base station into at least one cluster service area, and organizes at least one relay belonging to each of the at least one cluster service area into a cluster, a receiving unit which receives an access request message from a mobile station located in a cluster service area of a first cluster via a first relay belonging to the first cluster, a transmission path determination unit which determines a first data transmission path with respect to the mobile station based on the access request message, and a transmission unit which transmits the determined first data transmission path via the first relay in response to the access request message, wherein the first data transmission path passes a third relay belonging to the first cluster.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 7 is a flowchart illustrating a method of transmitting an access request message according to an exemplary embodiment.

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
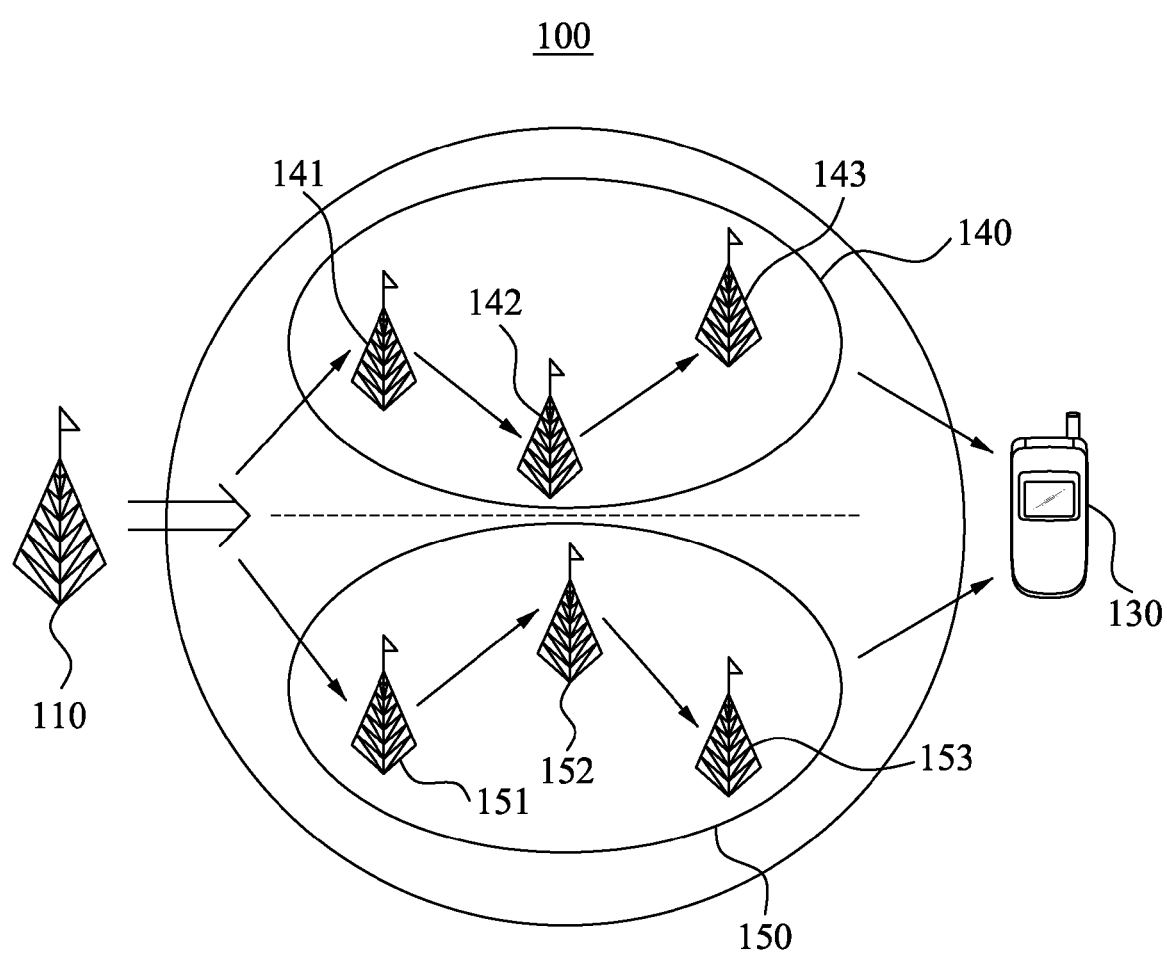
FIG. 1 is a conceptual diagram illustrating a communication system for transmitting data using a cooperative mesh relay divided into each cluster according to an exemplary embodiment.

FIG. 1 is a conceptual diagram illustrating a communication system 100 for transmitting data using a cooperative mesh relay divided into each cluster according to an exemplary embodiment. Referring to FIG. 1, the communication system 100 for transmitting data includes a base station (or base station apparatus) 110, a mobile station 130, and a plurality of relays 141, 142, 143, 151, 152, and 153. The plurality of relays 141, 142, 143, 151, 152, and 153 is divided into a first cluster 140 and a second cluster 150.

The base station 110 uses the plurality of relays 141, 142, 143, 151, 152, and 153 to communicate with the mobile station 130. When controlling each of the plurality of relays 141, 142, 143, 151, 152, and 153, the base station 110 may become overloaded. The base station 110 may divide the plurality of relays 141, 142, 143, 151, 152, and 153 into a plurality of clusters, and control each of the plurality of clusters. The base station 110 may transmit data to the relay 141 belonging to the first cluster 140, and the relay 141 receiving the data may transmit the data to the mobile station 130 via the other relays 142 and 143 belonging to the first cluster 140.

The mobile station 130 may select an access cluster, which is the first cluster 140, for connecting to the base station 110 from among the first cluster 140 and second cluster 150, and transmit an access request message to the base station 110 via the connected first cluster 140.

When transmitting the data via the first cluster 140, the mobile station 130 may perform a handover from the first cluster 140 to the second cluster 150 based on a signal received from the relays 151, 152, and 153 belonging to the second cluster 150.

Figure 2:
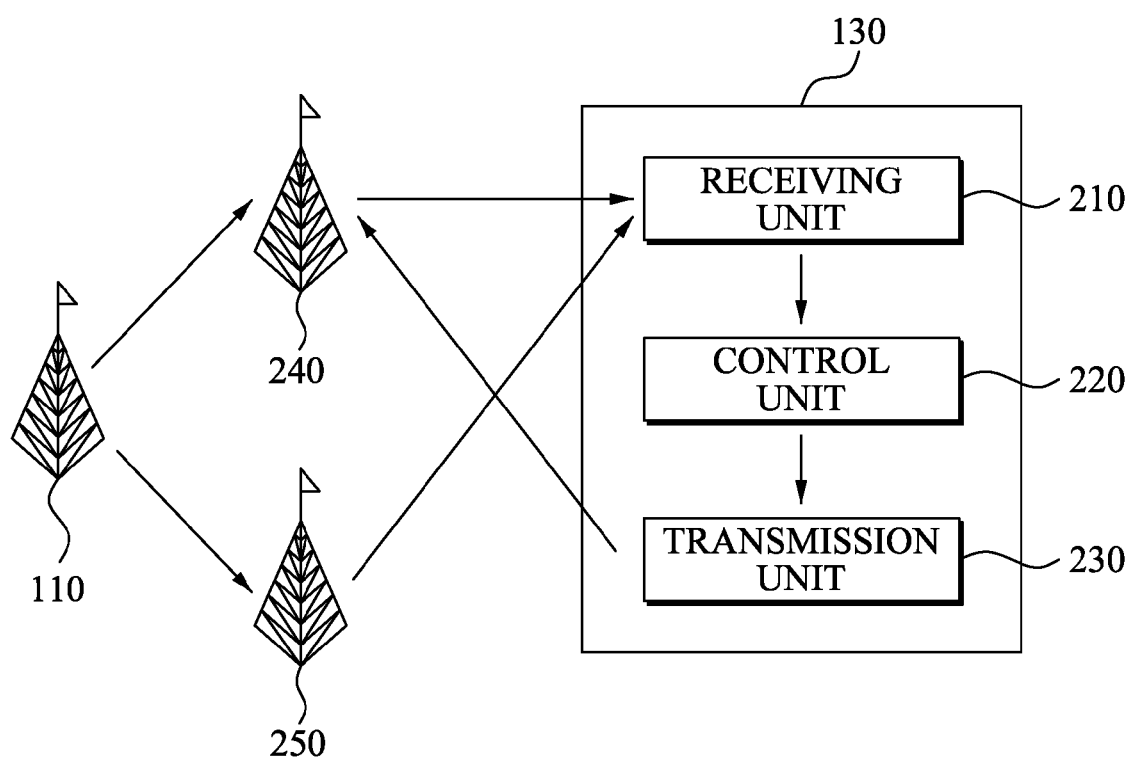
FIG. 2 is a block diagram illustrating a configuration of a mobile station selecting an access cluster to connect to a base station from a plurality of clusters according to an exemplary embodiment.

FIG. 2 is a block diagram illustrating a configuration of the mobile station 130 selecting an access cluster to connect to the base station 110 from among a plurality of clusters according to an exemplary embodiment. Referring to FIG. 2, the mobile station 130 includes a receiving unit 210, a control unit 220, and a transmission unit 230.

The receiving unit 210 receives a first preamble signal from a first relay 240 and receives a second preamble signal from a second relay 250. The first relay 240 belongs to a first cluster including an N1 number of relays and the second relay 250 belongs to a second cluster including an N2 number of relays. The receiving unit 210 may recognize a pattern of the first preamble signal and the second preamble signal.

The control unit 220 selects any one of the first cluster and the second cluster as an access cluster to connect to the base station 110, based on the first preamble signal and the second preamble signal.

Where the control unit 220 selects the first cluster as the access cluster, the transmission unit 230 may transmit an access request message to the first relay 240 belonging to the first cluster. The access request message is transmitted to the base station 110 via the first relay 240.

The first relay 240 may transmit the access request message to the base station 110 through a cooperative communication with other relays belonging to the first cluster.

The control unit 220 may select the access cluster based on received power of the first preamble signal and the second preamble signal. The received power of the first preamble signal and the second preamble signal depends on a state of a wireless channel from each of the first relay 240 and the second relay 250 to the mobile station 130. That is, when each of the first relay 240 and the second relay 250 transmits the first preamble signal and the second preamble signal with a same received power, respectively, and the state of the wireless channel from the first relay 240 to the mobile station 130 is superior to the state of the wireless channel from the second relay 250 to the mobile station 130, received power of the first preamble signal is higher than that of the second preamble signal. Accordingly, the control unit 220 may select the first relay 240, that transmitted a preamble signal with higher received power, as a relay to transmit the access request message, and select the first cluster the first relay 240 belongs to as the access cluster. The mobile station 130 transmits the access request message using the first relay 240 with a superior channel state, and thus a transmission success rate of the access request message may be improved.

The transmission unit 230 transmits the access request message to the first relay 240 belonging to the selected access cluster.

Figure 3:
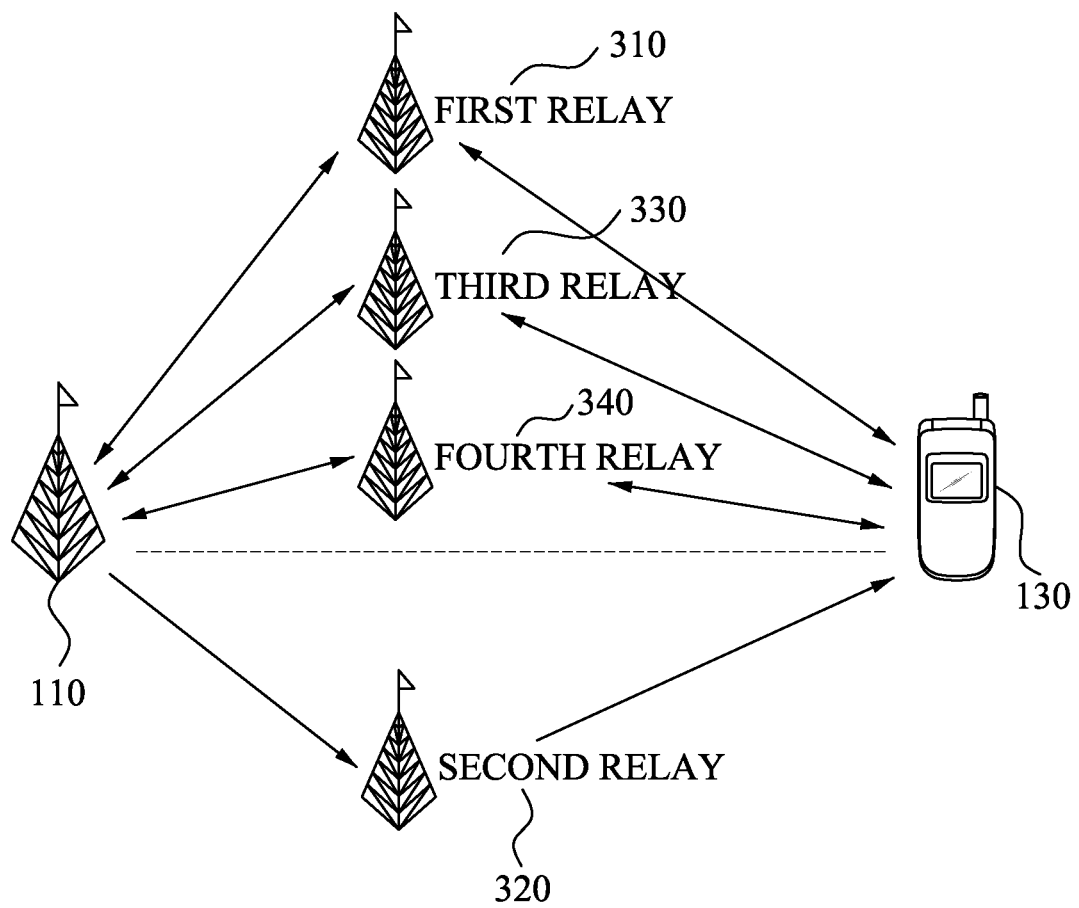
FIG. 3 is a diagram illustrating an operation of a mobile station selecting an access cluster from a plurality of clusters according to an exemplary embodiment.

FIG. 3 is a diagram illustrating an operation of the mobile station 130 selecting an access cluster from among a plurality of clusters according to an exemplary embodiment.

A first relay 310, a third relay 330, and a fourth relay 340 belong to a first cluster, and a second relay 320 belongs to a second cluster.

A mobile station 130 may receive a preamble signal from each of the first relay 310, third relay 330, fourth relay 340, and second relay 320, and select an access cluster based on the received preamble signal.

A pattern of a first preamble signal received from the first relay 310 belonging to the first cluster may be different from that of a second preamble signal received from the second relay 320 belonging to the second cluster. The mobile station 130 receiving the first and second preamble signals may identify the first and second clusters.

The first relay 310, third relay 330, and fourth relay 340 belonging to the first cluster may transmit a preamble signal with a same pattern. Received power of the preamble signal transmitted by each of the first relay 310, third relay 330, and fourth relay 340 may be lower than that of a preamble signal received from the second relay 320 belonging to the second cluster. However, a sum of the received power of the preamble signal transmitted by each of the first relay 310, third relay 330, and fourth relay 340 may be higher than that of the preamble signal received from the second relay 320. In this case, the mobile station 130 may select the first cluster as the access cluster. An access request message transmitted by the mobile station 130 is transmitted to each of the first relay 310, third relay 330, and fourth relay 340 belonging to the first cluster, and each of the first relay 310, third relay 330, and fourth relay 340 may transmit the access request message to the base station 110 through a cooperative communication.

The first relay 310, third relay 330, and fourth relay 340 belonging to the access cluster may transmit the access request message, received from the mobile station 130, to the base station 110 in a multi-hop way. According to another exemplary embodiment, the access request message may be transmitted via each of the first relay 310, third relay 330, and fourth relay 340 belonging to the access cluster to obtain a diversity gain.

The mobile station 130 may determine a data transmission path based on received power of the preamble signal received from each of the first relay 310, third relay 330, and fourth relay 340 belonging to the first cluster, and received power of the preamble signal received from the second relay 320 belonging to the second cluster.

The receiving unit 210 may receive preamble signals with a same pattern from a plurality of relays belonging to a same cluster, and a control unit 220 may select the access cluster for transmitting the access request message based on the received preamble signal. The control unit 220 may select the access cluster based on a sum of received power of the preamble signal from the plurality of relays belonging to a particular cluster.

The receiving unit 210 may receive preamble signals orthogonal to each other from the plurality of relays, and the control unit 220 may select the access cluster for transmitting the access request message based on the received preamble signal.

The first relay 310, third relay 330, and fourth relay 340 belonging to the first cluster may transmit different preamble signals. The first relay 310, third relay 330, and fourth relay 340 belonging to the first cluster may transmit each of the preamble signals that are orthogonal to each other. Also, the control unit 220 may select the access cluster for transmitting the access request message or determine the data transmission path based on the received first, second, third, and fourth preamble signals.

The control unit 220 may select a plurality of access clusters. The transmission unit 230 transmits the access request message to each relay belonging to the plurality of access clusters. The access request message is transmitted to the base station 110 through a cooperative communication of the relays belonging to each of the plurality of access clusters. Also, the base station 110 combines the access request message received from each of the plurality of access clusters, and thus a rate of receiving the access request message may be improved.

The receiving unit 210 may receive a first data transmission path including the third relay 330 belonging to the first cluster from the base station 110. The transmission unit 230 may transmit data to the base station 110 via the received first data transmission path.

The receiving unit 210 may receive a preamble signal from each of the first relay 310, second relay 320, third relay 330, and fourth relay 340. Also, the control unit 220 may determine the first data transmission path to transmit the data to the base station 110 based on the received preamble signal.

The first data transmission path may be a transmission path where the first relay 310, third relay 330, and fourth relay 340 belonging to the first cluster transmit the data through the cooperative communication.

The first data transmission path may be a transmission path where the first relay 310, third relay 330, and fourth relay 340 belonging to the first cluster transmit the data, received from the mobile station 130, to the base station 110 in a multi-hop way. According to another exemplary embodiment, the first data transmission path may be a transmission path where the first relay 310, third relay 330, and fourth relay 340 belonging to the access cluster receive the data from the mobile station 130 and transmit the received data to the base station 110.

The first data transmission path may be a transmission path where the first relay 310, third relay 330, and fourth relay 340 belonging to the first cluster and the second relay 320 belonging to the second cluster cooperate and transmit the data. The data may be transmitted via the second relay 320 belonging to the second cluster or be transmitted using the first relay 310, third relay 330, and fourth relay 340 belonging to the first cluster.

The mobile station 130 may receive the data from the first relay 310, second relay 320, third relay 330, and fourth relay 340. An error rate of the data transmitted by each of the first relay 310, second relay 320, third relay 330, and fourth relay 340 to the mobile station 130 is determined according to a state of a wireless channel from each of the first relay 310, second relay 320, third relay 330, and fourth relay 340 to the mobile station 130. The mobile station 130 may select only data received via a superior wireless channel, and thus a data transmission efficiency from the base station 110 to the mobile station 130 may be improved.

The first relay 310 may transmit the data to the third relay 330. The first relay 310 may transmit the data to the mobile station 130, and the third relay 330 may transmit the data, received from the first relay 310, to the mobile station 130.

Where the mobile station 130 transmits the data to the base station 110 via the first data transmission path including the third relay 330, the receiving unit 210 may receive the third preamble signal from the third relay 330 belonging to the first cluster, and receive the fourth preamble signal from the fourth relay 340. The control unit 220 may determine whether to change the data transmission path based on the third preamble signal and the fourth preamble signal. Where received power of the third preamble signal received from the third relay 330 which currently transmits the data is lower than that of the fourth preamble signal received from the fourth relay 340, the control unit 220 may determine to change the data transmission path.

The transmission unit 230 may transmit a data transmission path change request message to the base station 110 via the third relay 330 according to the determination of the control unit 220. The receiving unit 210 may receive a second data transmission path in response to the data transmission path change request message. Also, the transmission unit 230 may transmit second data to the base station 110 via the fourth relay 340 included in the second data transmission path.

Where the mobile station 130 transmits the data to the base station 110 via the first data transmission path including the third relay 330, the receiving unit 210 may receive the third preamble signal from the third relay 330 and the second preamble signal from the second relay 320 belonging to the second cluster.

The control unit 220 may determine whether to perform a handover from the first cluster to the second cluster based on the second preamble signal and the third preamble signal. Where received power of the second preamble signal is higher than that of the third preamble signal, the control unit 220 may determine to perform the handover from the first cluster to the second cluster. The transmission unit 230 may transmit a cluster handover request message to the base station 110 via the third relay 330 according to the determination of the control unit 220.

The receiving unit 210 may receive the second data transmission path including the second relay 320 via the third relay 330 in response to the cluster handover request message. The transmission unit 230 may transmit the second data to the base station 110 via the received second data transmission path.

Figure 4:
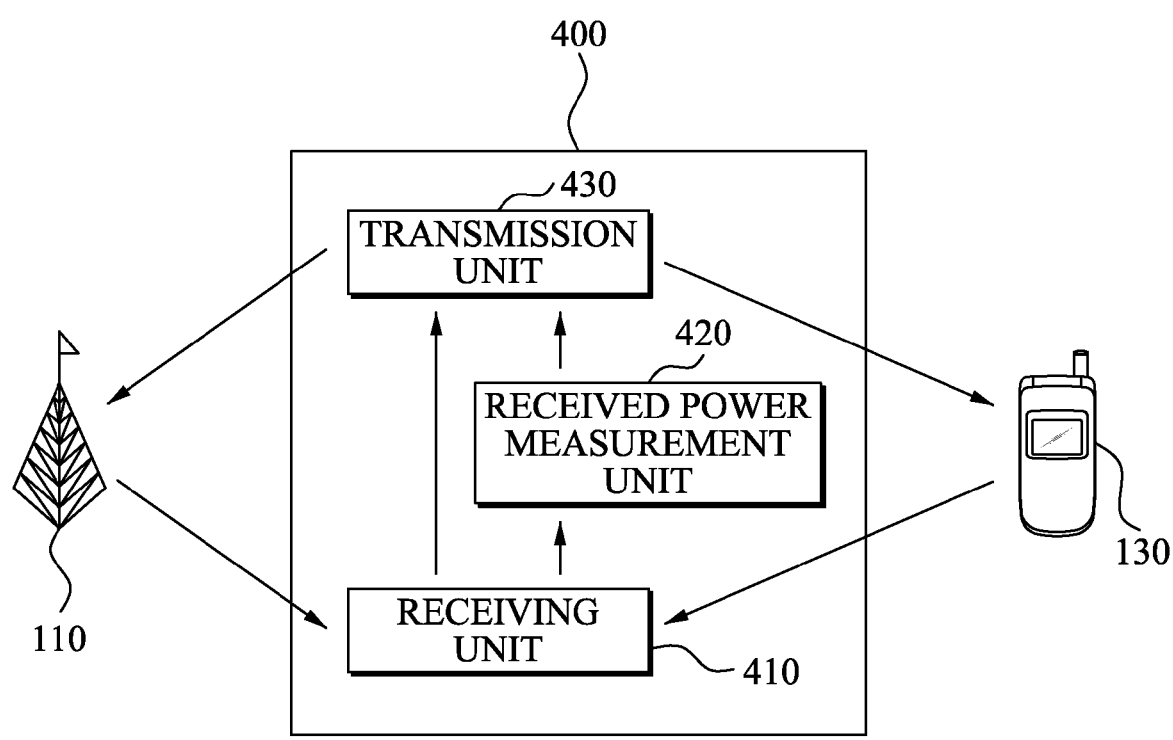
FIG. 4 is a block diagram illustrating a configuration of a relay transmitting an access request message, received from a mobile station, to a base station according to an exemplary embodiment.

FIG. 4 is a block diagram illustrating a configuration of a relay 400 transmitting an access request message, received from a mobile station, to a base station according to an exemplary embodiment. Referring to FIG. 4, the relay 400 includes a receiving unit 410, a received power measurement unit 420, and a transmission unit 430.

The transmission unit 430 transmits a preamble signal to the mobile station 130 located in a service area of a cluster including a plurality of relays. Each of the relays belonging to a same cluster may transmit preamble signals with a same pattern and preamble signals with different patterns.

The receiving unit 410 receives an access request message generated based on the transmitted preamble signal from the mobile station 130. The transmission unit 430 transmits the received access request message to the base station 110 where the relay 400 belongs.

The received power measurement unit 420 measures received power of a received signal associated with the access request message. The received power measurement unit 420 may measure received power of a signal transmitting the access request message, and the transmission unit 430 may transmit the measured received power to the base station 110.

The mobile station 130 may transmit the access request message to the plurality of relays. The plurality of relays measures received power of the signal transmitting the access request message, and transmits the measured received power to the base station 110. The base station 110 may determine a data transmission path to transmit data to the mobile station 130 based on the measured received power. The mobile station 130 may receive the data transmission path from the base station 110 via the relay 400, and transmit the data to the base station 110 based on the data transmission path received from the base station 110.

The transmission unit 430 transmits the received power, measured by the received power measurement unit 420, to the base station 110. Also, the transmission unit 410 may receive the determined data transmission path based on the received power.

Figure 5:
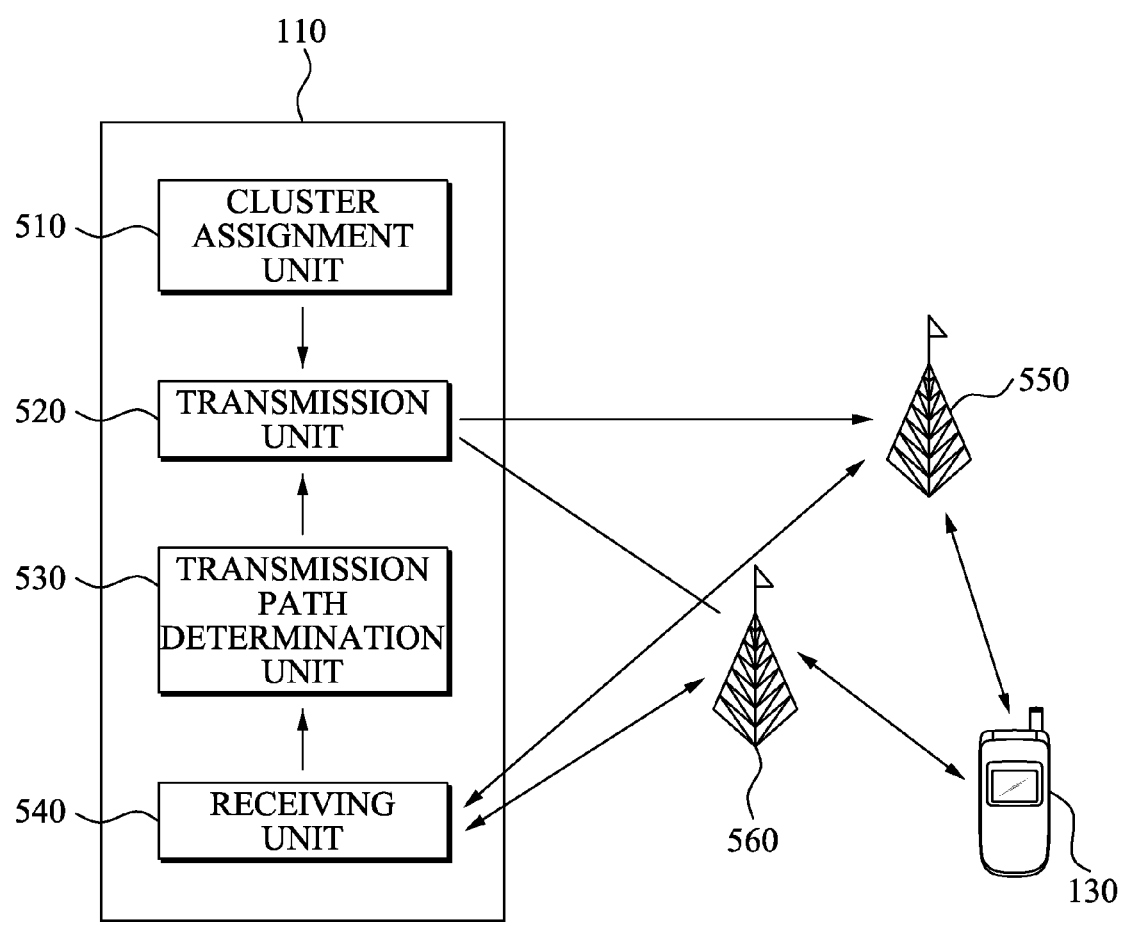
FIG. 5 is a block diagram illustrating a configuration of a base station receiving an access request message from a mobile station via a plurality of relays belonging to each cluster according to an exemplary embodiment.

FIG. 5 is a block diagram illustrating a configuration of the base station 110 receiving an access request message from the mobile station 130 via a plurality of relays belonging to each cluster according to an exemplary embodiment. Referring to FIG. 5, the base station 110 includes a cluster assignment unit 510, a transmission unit 520, a transmission path determination unit 530, and a receiving unit 540.

The cluster assignment unit 510 divides a coverage of the base station 110 into at least one cluster service area, and organizes at least one relay belonging to each of the at least one cluster service area into a cluster.

The receiving unit 540 receives an access request message from a mobile station 130 located in a cluster service area of a first cluster via a first relay 550 belonging to the first cluster.

The transmission path determination unit 530 determines a first data transmission path with respect to the mobile station 130 based on the access request message. The first data transmission path may include a third relay belonging to the first cluster.

The transmission unit 520 transmits the determined first data transmission path via the first relay in response to the access request message.

The receiving unit 540 may receive received power of a received signal associated with the access request message from the first relay 550, and the transmission path determination unit 530 may determine a data transmission path based on the received power. When the mobile station 130 transmits the access request message via the plurality of relays, that is, the first relay 550 and second relay 560, each of the first relay 550 and the second relay 560 may measure received power of a signal transmitting the access request message, and transmit the measured received power to the base station 110. The received power measured by each of the first relay 550 and the second relay 560 is associated with a state of a wireless channel from the mobile station 130 to each of the first relay 550 and the second relay 560. Where received power received from the first relay 550 is higher than received power received from the second relay 560, a state of a wireless channel from the first relay 550 to the mobile station 130 is superior to that of a wireless channel from the second relay 560 to the mobile station 130. Accordingly, the transmission path determination unit 530 may determine the data transmission path enabling the data to be transmitted using a superior wireless channel, based on the received power received from each of the first relay 550 and the second relay 560.

Where receiving the data from the mobile station 130 via the third relay, the receiving unit 540 may receive a data transmission path change request message from the mobile station 130 via the third relay. The transmission path determination unit 530 may determine a second data transmission path including a fourth relay belonging to the first cluster based on the data transmission path change request message. Also, the transmission unit 520 may transmit the second data transmission path to the mobile station 130 via the third relay, and transmit second data to the mobile station 130 via the fourth relay included in the second data transmission path.

Where receiving the data from the mobile station 130 via the third relay, the receiving unit 540 may receive a cluster handover request message from the first cluster to a second cluster, from the mobile station 130 via the third relay. The transmission path determination unit 530 may determine a second data transmission path including the second relay 560 belonging to the second cluster, based on the cluster handover request message. The transmission unit 520 may transmit the second data to the mobile station 130 via the second relay 560 included in the second data transmission path.

Figure 6A:
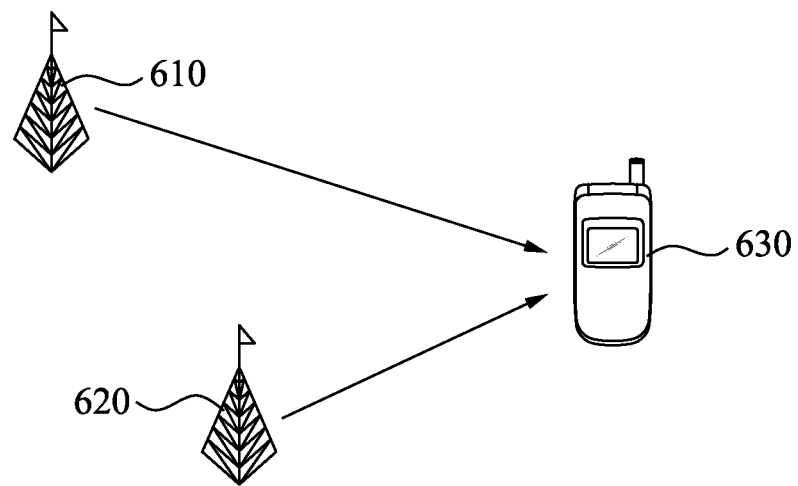
FIGS. 6A, 6B, and 6C are diagrams illustrating configurations of downlink data frames which are synchronized using a preamble signal so that a downlink data area transmitted by each of a plurality of relays belonging to a particular cluster is received in a particular mobile station during a same time duration according to an exemplary embodiment.
Figure 6B:
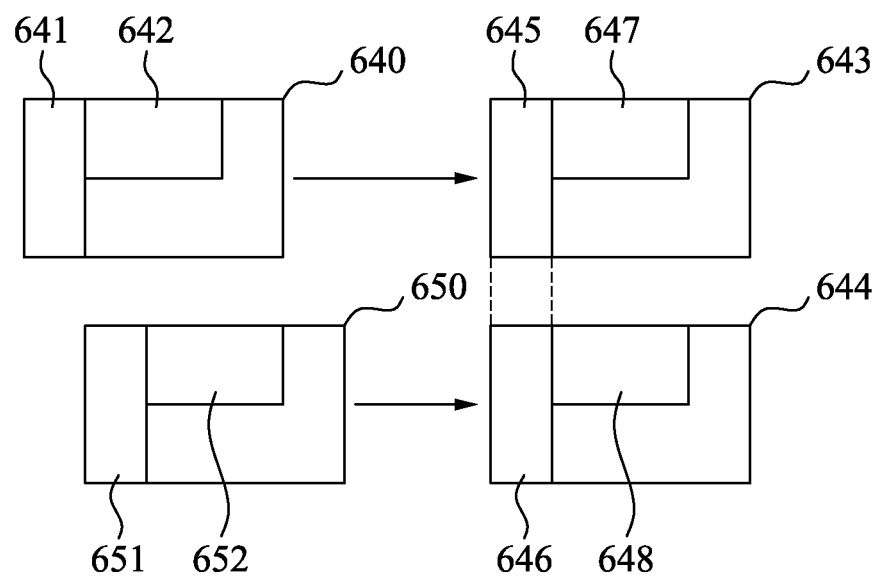
Figure 6C:
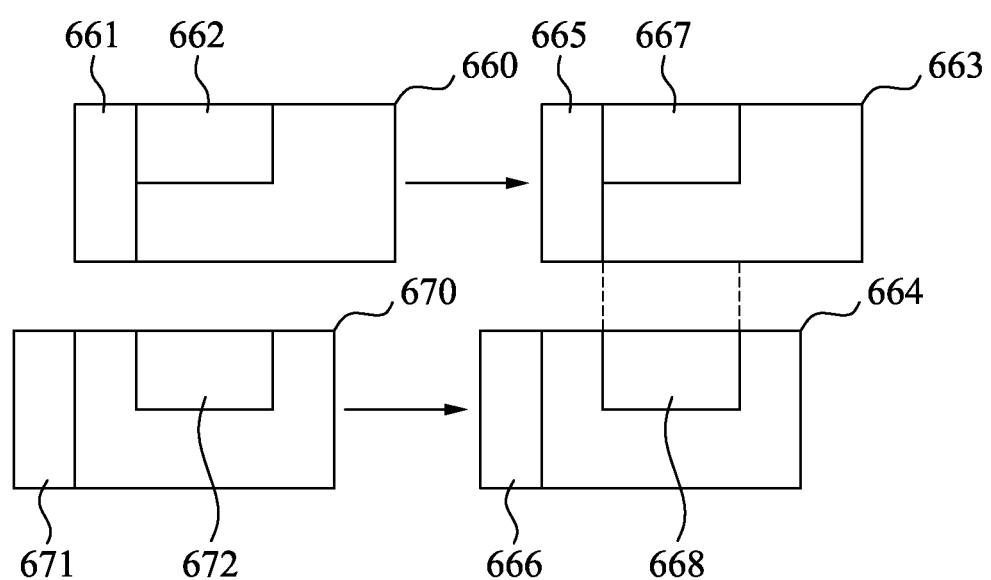

FIGS. 6A, 6B, and 6C are diagrams illustrating configurations of downlink data frames 640, 650, 643, 644, 660, 663, 664, and 670 which are synchronized using a preamble signal so that a downlink data area transmitted by each of a plurality of relays belonging to a particular cluster is received in a particular mobile station during a same time duration according to an exemplary embodiment. Referring to FIGS. 6A, 6B, and 6C, the downlink data frames 640, 650, 643, 644, 660, 663, 664, and 670 include preamble signal areas 641, 651, 645, 646, 661, 671, 665, and 666, and downlink data areas 642, 652, 647, 648, 662, 672, 667, and 668, respectively.

Each relay 610 and 620 belonging to a base station may transmit data received from the base station to a plurality of mobile stations. The relays 610 and 620 may include the data in a same data frame and transmit the data.

A mobile station 630 belonging to the base station may receive the data from each of the relays 610 and 620. The data received from the relay 610 and the data received from the relay 620 may be identical or different from each other.

Distances between each of the relays 610 and 620 and the mobile station 630 are different. Since each of the relays 610 and 620 transmits the data to the plurality of mobile stations, a data transmission time may not be adjusted considering the distances to each of the plurality of mobile stations. Accordingly, even where the mobile station 630 receives the same data from each of the relays 610 and 620, a time when the data is received may be different.

The mobile station 630 may receive the same data from each of the relays 610 and 620 for time durations different from each other, and combine the received data considering the time when the data is received. Error rates of the data transmitted from each of the relays 610 and 620 to the mobile station 630 may be determined according to a state of a wireless channel from each of the relays 610 and 620 to the mobile station 630. Where the state of the wireless channel from each of the relays 610 and 620 to the mobile station 630 independently changes, the mobile station 630 may select only data received via a superior wireless channel, or may put more weight on the data received via the superior wireless channel and combine the data received. Accordingly, a data transmission efficiency from the relays 610 and 620 to the mobile station 630 is improved.

Hereinafter, an embodiment is disclosed where each of a first relay 610 and second relay 620 adjusts a transmission time and transmits data so that the data transmitted by each of the first relay 610 and second relay 620 and received in a mobile station 630 in synch.

FIG. 6A illustrates that the first relay 610 and the second relay 620, located in different places, transmit the data to the mobile station 630. In this instance, a distance between the mobile station 630 and the first relay 610 is different from a distance between the mobile station 630 and the second relay 620.

It is very typical situation that the distance from the terminal 630 to the relay 610 has different value from the distance from the terminal 620 to the relay 610. And the delay time for transmitting signal from the relay 610 to the terminal 630 is not same from the delay time for transmitting signal from the relay 620 to the terminal 630.

FIG. 6B illustrates that the data frames 640 and 650 are synchronized and received in the mobile station 630, where the first relay 610 and second relay 620 belonging to the same cluster transmit the data frames 640 and 650 at different times.

The data frames 640 and 650 may be data frames in a physical layer transmitting the data to the mobile station 630 from the first relay 610 and second relay 620.

The data, transmitted from the base station to the mobile station 630 via the first relay 610 and second relay 620 belonging to the same cluster, may be included in a data frame including the preamble signal areas 641 and 651 and downlink data areas 642 and 652, and transmitted to the mobile station 630.

The first data frame 640 transmitted by the first relay 610 includes the preamble signal area 641 and the downlink data area 642. The second data frame 650 transmitted by the second relay 620 includes the preamble signal area 651 and the downlink data area 652. Data included in the downlink data area 642 and the downlink data area 652 is transmitted to the mobile station 630 via each of the first relay 610 and second relay 620 from the base station.

Since the distance between the mobile station 630 and each of the first relay 610 and second relay 620 is different, when each of the first relay 610 and second relay 620 transmits the downlink data frames 640 and 650 to the mobile station 630 at a same time, the mobile station 630 receives the downlink data frames 643 and 644 at different times. Each of the first relay 610 and second relay 620 transmits the downlink data frames 640 and 650 at different times considering the distance from each of the first relay 610 and the second relay 620 to the mobile station 630. The transmitted downlink data frames 643 and 644 may be received in the mobile station 630 during a same time duration. Since each of the downlink data frames 643 and 644 includes the downlink data areas 647 and 648 during a same time duration of the downlink data frames 643 and 644, when the downlink data frames 643 and 644 are received during the same time duration, the downlink data areas 647 and 648 are received during the same time duration.

A downlink data area transmitted by each of a plurality of relays belonging to a particular cluster may be synchronized using a preamble signal in order to be received in the mobile station 630 at a same time. The mobile station 630 receives a preamble signal of the preamble signal area 641 included in the downlink data frame 640 and a preamble signal of the preamble signal area 651 included in the downlink data frame 650. Also, the mobile station 630 may determine whether each of the downlink data frames 643 and 644 is received during the same time duration based on the received preamble signal of each of the preamble signal area 645 and the preamble signal area 646. Where each of the downlink data frames 643 and 644 is not received during the same time duration, the mobile station 630 may transmit a control signal to the first relay 610 and second relay 620. The control signal controls a time when each of the first relay 610 and second relay 620 transmits each of the downlink data frames 640 and 650. Each of the first relay 610 and second relay 620 may correct the transmission time of each of the downlink data frames 640 and 650 based on the control signal.

FIG. 6C illustrates that data of the downlink data area 667 included in the downlink data frame 663 and data of the downlink data areas 668 included in the downlink data frame 664 are received in synch, even where the first downlink data frame 660 and second downlink data frame 670 transmitted by the first relay 610 and the second relay 620 are not received in synch.

The first downlink data frame 660 may include the preamble signal area 661 and the downlink data area 662, and the second downlink data frame 670 may include the preamble signal area 671 and the downlink data area 672. The first downlink data frame 660 is transmitted from the first relay 610 to the mobile station 630, and the second downlink data frame 670 is transmitted from the second relay 620 to the mobile station 630. The downlink data areas 662 and 672 may be included in different places in each of the first downlink data frame 660 and second downlink data frame 670, and be transmitted to the mobile station 630.

The mobile station 630 receives the first downlink data frame 663 and second downlink data frame 664 during different time durations. However, each of the downlink data area 667, included in the downlink data frame 663, and the downlink data area 668, included in the downlink data frame 664, may be received in synch.

The mobile station 630 may transmit the control signal to each of the first relay 610 and the second relay 620 based on each of preamble signals of the preamble signal area 665 and the preamble signal area 666 so that the downlink data areas 667 and 668 are received in synch. The preamble signal of the preamble signal area 665 is included in the first downlink data frame 663, and the preamble signal of the preamble signal area 666 is included in the second downlink data frame 664. Also, each of the first relay 610 and the second relay 620 may adjust a transmission time of each of the downlink data areas 667 and 668 and transmit downlink data to the mobile station 630.

FIG. 7 is a flowchart illustrating a method of transmitting an access request message according to an exemplary embodiment.

In operation S721, a first relay 711 transmits a first preamble signal to a mobile station 713 belonging to a first cluster.

In operation S722, a second relay 712 transmits a second preamble signal to the mobile station 713 belonging to a second cluster.

In operation S723, an access cluster may be selected based on the first preamble signal and second preamble signal. The mobile station 713 may select the access cluster based on received power of the first preamble signal and second preamble signal.

In operation S730, an access request message is transmitted to a relay belonging to the selected access cluster. In FIG. 7, it is illustrated that the mobile station 713 selects the first cluster as the access cluster and the access request message is transmitted to the first relay 711 belonging to the first cluster.

In operation S740, the first relay 711 receiving the access request message measures received power of a received signal associated with the access request message. The received signal of the access request message from the mobile station 713 depends on a state of a wireless channel between the mobile station 713 and the first relay 711. Where the state of the wireless channel is excellent, the received power of the received signal associated with the access request message is high.

In operation S750, the first relay 711 may transmit the access request message to a base station 710. The first relay 711 receiving the access request message may transmit the access request message to the base station 710 through a cooperative communication with other relays belonging to the first cluster.

A plurality of relays may receive the access request message. The plurality of relays may transmit the received access request message to the base station 710.

In operation S760, the base station 710 may determine a data transmission path transmitting data to the mobile station 713 from the base station 710. The base station 710 may include a relay having a highest received power of the received signal associated with the access request from the plurality of relays in the data transmission path, and determine the data transmission path.

The data transmission path determined by the base station 710 may be a data transmission path where the plurality of relays of the first cluster transmits the data to the mobile station through a cooperative communication.

In operation S770, the data transmission path determined by the base station 710 is transmitted to the mobile station 713 from the base station 710 via the first relay 711. The data transmission path includes a third relay belonging to the first cluster and the mobile station 713 may transmit the data to the base station 710 via the third relay.

Figure 8:
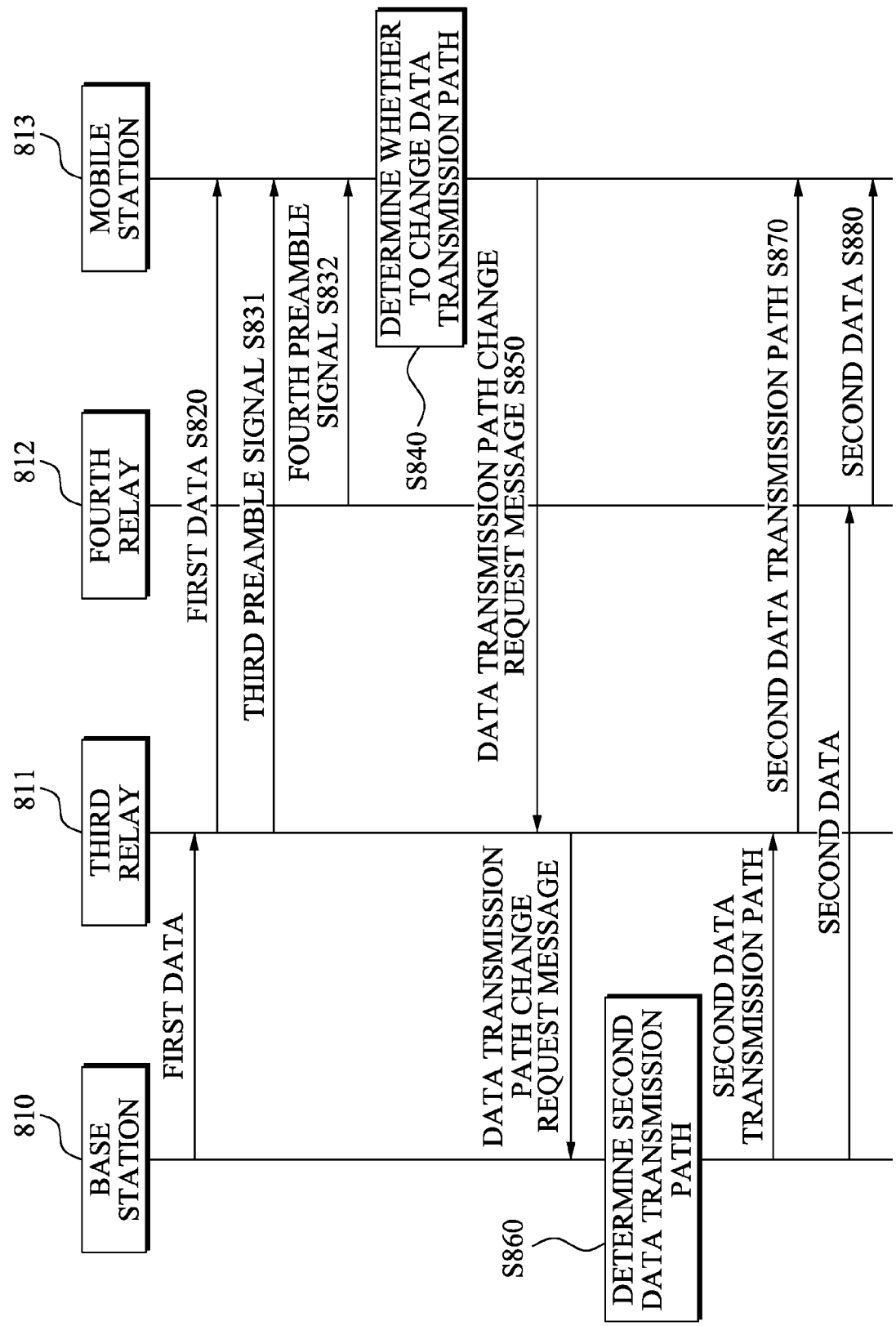
FIG. 8 is a flowchart illustrating a method of transmitting a data transmission path change request message according to an exemplary embodiment.

FIG. 8 is a flowchart illustrating a method of transmitting a data transmission path change request message according to an exemplary embodiment.

In operation S820, a base station 810 transmits first data to a mobile station 813 via a third relay 811 belonging to a first cluster.

In operation S831, the third relay 811 transmits a third preamble signal to the mobile station 813.

In operation S832, a fourth relay 812 belonging to the first cluster transmits a fourth preamble signal to the mobile station 813.

In operation S840, the mobile station 813 determines whether to change a data transmission path based on the third preamble signal and fourth preamble signal. Whether to change the data transmission path may be determined based on received power of the third preamble signal and fourth preamble signal in operation S840. The received power of each of the third preamble signal and fourth preamble signal received from each of the third relay 811 and the fourth relay 812 depends on a state of a wireless channel from each of the third relay 811 and the fourth relay 812 to the mobile station 813. Accordingly, where the data transmission path is changed to include a relay having a high received power, data may be transmitted via only relay with a superior state of a wireless channel.

In operation S850, the data transmission path change request message may be transmitted from the mobile station 813 to the base station 810 via the third relay 811.

In operation S860, the base station 810 determines a second data transmission path based on the data transmission path change request message. Where the mobile station 813 receives a preamble signal with a highest received power from the fourth relay 812, the base station 810 may determine to include the fourth relay 812 in the second data transmission path.

In operation S870, the base station 810 transmits the determined second data transmission path to the mobile station 813 via the third relay 811.

In operation S880, the base station 810 transmits second data to the mobile station 813 via the second data transmission path.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

Further, a data frame to transmit a preamble signal area and downlink data area may be recorded, stored, or fixed in one or more computer-readable media.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile station which connects to a base station, the base station having a plurality of relays belonging thereto, and the mobile station comprising:
a receiving unit which receives a plurality of first preamble signals from a plurality of first relays and receives a plurality of second preamble signals from a plurality of second relays, the first relays belonging to a first cluster including an N1 number of relays and the second relays belonging to a second cluster including an N2 number of relays;
a control unit which selects the first cluster as an access cluster to connect to the base station, based on a sum of received power of the first preamble signals and a sum of received power of the second preamble signals; and
a transmission unit which transmits an access request message to at least one relay among the first relays,
wherein the access request message is transmitted to the base station via the at least one relay among the first relays.

2. The mobile station of claim 1, wherein patterns of the first preamble signals are the same as each other, and the patterns of the first preamble signals are different from patterns of the second preamble signals.

3. The mobile station of claim 1, wherein, the control unit determines a data transmission path including at least one of the first relays, based on the first preamble signals and the second preamble signals, and the transmission unit transmits data to the base station based on the determined data transmission path.

4. The mobile station of claim 1, wherein patterns of the first preamble signals are orthogonal to each other.

5. The mobile station of claim 1, wherein the receiving unit receives a first data transmission path including a third relay belonging to the first cluster from the base station, and the transmission unit transmits data to the base station via the received first data transmission path.

6. The mobile station of claim 5, wherein the receiving unit receives a third preamble signal from the third relay and receives a fourth preamble signal from a fourth relay belonging to the first cluster, respectively, the control unit determines whether to change a data transmission path based on the third preamble signal and fourth preamble signal, and the transmission unit transmits a data transmission path change request message to the base station via the third relay according to the determination.

7. The mobile station of claim 5, wherein the receiving unit receives a second data transmission path from the base station via the third relay, and the transmission unit transmits second data to the base station via a fourth relay included in the second data transmission path.

8. The mobile station of claim 5, wherein the receiving unit receives data from the base station via the third relay and receives a third preamble signal from the third relay, the control unit determines whether to perform a handover from the first cluster to the second cluster based on the second preamble signal and third preamble signal, and the transmission unit transmits a cluster handover request message from the first cluster to the second cluster to the base station via the third relay according to the determination.

9. The mobile station of claim 8, wherein the receiving unit receives a second data transmission path including the second relay via the third relay in response to the cluster handover request message from the first cluster to the second cluster, and the transmission unit transmits second data to the base station via the received second data transmission path.

10. A communication system comprising a mobile station and a relay which is belongs to a cluster including a plurality of relays, wherein the relay comprising:
a transmission unit configured to transmit a preamble signal to mobile station located in a service area of the cluster;
a receiving unit configured to receive from the mobile station an access request message; and
a received power measurement unit configured to measure received power of a received signal associated with the access request message, wherein the transmission unit transmits the received access request message to a base station where the relay belongs;
wherein the mobile station comprising;
a control unit configured to generate the access request based on a sum of received power of the transmitted preamble signal and received power of a second preamble signal transmitted from a second relay belonging to the cluster to the mobile station and a sum of received power of third preamble signals transmitted from a plurality of relays belonging to a second cluster to the mobile station; and
a transmission unit configured to transmit the access request message to the relay.

11. The relay of claim 10,
wherein the transmission unit transmits a data transmission path determined based on the measured received power to the mobile station.

12. The relay of claim 11, wherein the transmission unit transmits the measured received power to the base station, and the receiving unit receives the data transmission path determined based on the measured received power from the base station.

13. A communication system comprising a mobile station and a base station apparatus, wherein the base station apparatus comprising:
a cluster assignment unit configured to divide a coverage of a base station into at least one cluster service area, and configured to organize at least one relay belonging to each of the at least one cluster service area into a cluster;
a receiving unit configured to receive an access request message from a mobile station located in a cluster service area of a first cluster via at least one of first relays belonging to the first cluster;
a transmission path determination unit configured to determine a first data transmission path with respect to the mobile station based on the access request message; and
a transmission unit configured to transmit the determined first data transmission path via the at least one of first relays in response to the access request message, wherein the first data transmission path passes a third relay belonging the first cluster;
wherein the mobile station comprising;
a control unit configured to generate the access request based on a sum of received power of first preamble signals transmitted from the plurality of first relays belonging to the first cluster to the mobile station and a sum of received power of second preamble signals transmitted from a plurality of second relays belonging to a second cluster to the mobile station; and
a transmission unit configured to transmit the access request message to the at least one relay.

14. The base station apparatus of claim 13, wherein the receiving unit receives received power of a received signal associated with the access request message from the at least one of first relays, and the transmission path determination unit determines the first data transmission path based on the received power.

15. The base station apparatus of claim 14, wherein the receiving unit receives a cluster handover request message via the third relay, the cluster handover request message requiring a handover from the first cluster to a second cluster, the transmission path determination unit determines a second data transmission path including the second relay based on the cluster handover request message from the first cluster to the second cluster, and the transmission unit transmits the second data transmission path to the mobile station via the third relay and transmits second data to the mobile station via the second relay.

16. The base station apparatus of claim 13, wherein the receiving unit receives a data transmission path change request message from the mobile station via the third relay, the transmission path determination unit determines a second data transmission path including a fourth relay belonging to the first cluster based on the data transmission path change request message, and the transmission unit transmits the second data transmission path to the mobile station via the third relay, and transmits second data to the mobile station via the fourth relay.

17. A non-transitory computer-readable recording medium which stores a downlink data frame, comprising:

a preamble signal area; and a downlink data area which includes downlink data transmitted to a mobile station from a base station via a relay, wherein the downlink data frame is transmitted via at least one of relays belonging to a cluster which is selected as an access cluster from a first cluster including N1 relays and a second cluster including N2 relays among relays included in the base station, based on a sum of received power of first preamble signals transmitted from a plurality of first relays belonging to the first cluster to the mobile station, and a sum of received power of second preamble signals transmitted from a plurality of second relays belonging to the second cluster to the mobile station, wherein the downlink data area is transmitted to the mobile station from a plurality of relays belonging to a particular cluster, and is synchronized using a preamble signal in order to be received in the mobile station during a same time duration and thereby is transmitted, and wherein the mobile station transmits a control signal to one or more of the plurality of relays to correct a transmission time of the downlink data from the relay to the mobile station, if the downlink data area transmitted from the plurality of relays is received in the mobile station during a different time duration.

* * * * *